United States Patent
Bolenbaugh

(10) Patent No.: US 10,086,818 B2
(45) Date of Patent: Oct. 2, 2018

(54) SYSTEMS AND METHODS FOR MANAGING VEHICULAR ENERGY CONSUMPTION

(71) Applicant: GM GLOBAL TECHNOLOGY OPERATIONS LLC, Detroit, MI (US)

(72) Inventor: Jonathan M. Bolenbaugh, Davidson, NC (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 14/989,150

(22) Filed: Jan. 6, 2016

(65) Prior Publication Data

US 2016/0193993 A1 Jul. 7, 2016

Related U.S. Application Data

(60) Provisional application No. 62/100,634, filed on Jan. 7, 2015.

(51) Int. Cl.
*B60L 9/00* (2006.01)
*B60L 11/00* (2006.01)
(Continued)

(52) U.S. Cl.
CPC ............ *B60W 10/08* (2013.01); *B60W 10/06* (2013.01); *B60W 10/30* (2013.01); *B60W 20/13* (2016.01); *B60W 2510/244* (2013.01); *B60W 2710/305* (2013.01); *Y02T 10/6286* (2013.01); *Y10S 903/93* (2013.01)

(58) Field of Classification Search
CPC ...... B60W 10/08; B60W 20/13; B60W 10/06; B60W 10/30; B60W 30/182; B60W 2510/244; B60W 2530/00; B60W 2710/06; B60W 2710/08; B60W 2710/244; B60W 2710/305; Y02T 10/6286; Y02T 10/7241; Y10S 903/93
USPC .......................................................... 701/22
See application file for complete search history.

(56) References Cited

U.S. PATENT DOCUMENTS

| | | | |
|---|---|---|---|
| 5,507,153 A | 4/1996 | Seto et al. | |
| 2006/0048984 A1* | 3/2006 | Pleune | B60K 11/04 180/68.4 |

(Continued)

FOREIGN PATENT DOCUMENTS

| | | |
|---|---|---|
| DE | 102007039107 A1 | 2/2009 |
| DE | 102010034672 A1 | 2/2012 |

OTHER PUBLICATIONS

German Patent and Trade Mark Office, Office Action in German Patent Application No. 10 2016 101 258.0, dated Apr. 21, 2016.

(Continued)

*Primary Examiner* — Aaron L Troost
*Assistant Examiner* — Paula L Schneider
(74) *Attorney, Agent, or Firm* — Lorenz & Kopf, LLP

(57) ABSTRACT

A vehicle includes a motor-generator unit, an energy storage system, and a high-voltage load (such as an electric compressor and/or electric heater), all interconnected via a high-voltage bus. The motor-generator unit is configured to operate in a regenerative mode and a non-regenerative mode with respect to the high-voltage bus. A control module is configured to operate the load at a first power consumption level during the regenerative mode, and to operate the high-voltage load at a second power consumption level, less than the first power consumption level, during the non-regenerative mode.

17 Claims, 2 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 10/08* (2006.01)
*B60W 10/06* (2006.01)
*B60W 10/30* (2006.01)
*B60W 20/13* (2016.01)

(56) References Cited

U.S. PATENT DOCUMENTS

| | | | |
|---|---|---|---|
| 2008/0224663 A1* | 9/2008 | Mack | B60K 6/365 |
| | | | 320/132 |
| 2013/0138279 A1* | 5/2013 | Shi | B60L 1/00 |
| | | | 701/22 |
| 2014/0200763 A1* | 7/2014 | Sisk | B60W 10/24 |
| | | | 701/36 |
| 2014/0210384 A1* | 7/2014 | Koyama | B60L 7/18 |
| | | | 318/376 |
| 2014/0266038 A1* | 9/2014 | Gibeau | B60L 11/1875 |
| | | | 320/109 |
| 2015/0120120 A1* | 4/2015 | Ota | B60W 30/18127 |
| | | | 701/22 |

OTHER PUBLICATIONS

China Patent and Trade Mark Office, Office Action in China Patent Application No. 201610206032.6, dated Jun. 14, 2018.

\* cited by examiner

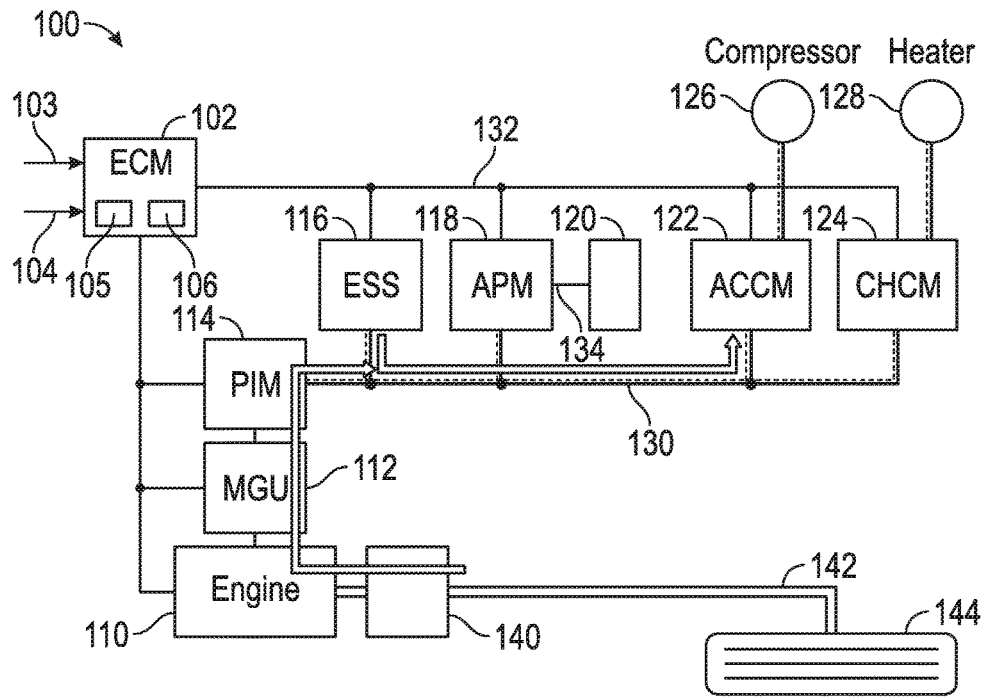
FIG. 3
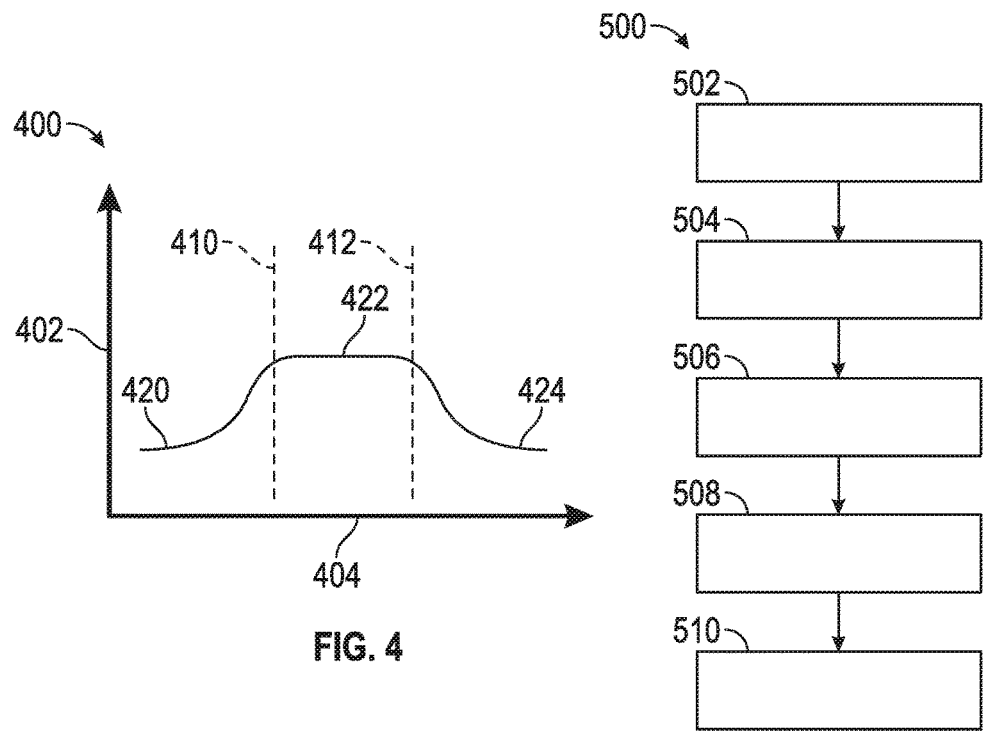
FIG. 4
FIG. 5

SYSTEMS AND METHODS FOR MANAGING VEHICULAR ENERGY CONSUMPTION

CROSS-REFERENCE TO RELATED APPLICATIONS

This application claims priority to U.S. Provisional Patent Application No. 62/100,634, filed Jan. 7, 2015, the contents of which are hereby incorporated by reference.

TECHNICAL FIELD

The technical field generally relates to automotive vehicles, and more particularly relates to systems and methods for managing energy consumption in vehicles incorporating an energy storage system, such as electric and hybrid vehicles.

BACKGROUND

Modern hybrid and electric vehicles typically include a variety of high-voltage electrical components. For example, since most hybrid vehicles include an "auto-stop" feature that allows the internal combustion engine to turn off when not needed, the traditional belt-driven air-conditioner compressor in such vehicles has generally been replaced with a high-voltage electrical compressor. Similarly, such vehicles typically incorporate a high-voltage electrical heater. Other than the load required for propelling the vehicle, high voltage components such as the compressor and heater constitute the greatest loads experienced by the high-voltage systems of such vehicles.

Hybrid and electric vehicles also typically include some form of energy storage system (ESS), such as a set of rechargeable battery cells. Drawing power from the ESS to operate high-load components such as the compressor and heater results in an increased number of charge/discharge cycles. The act of charging and discharging the ESS results in resistive heating losses proportional to the product of the effective resistance and the square of the current required during charge/discharge. Accordingly, drawing power from the ESS to run high-load components is non-optimal from an efficiency standpoint.

Accordingly, it is desirable to provide improved systems and methods for managing energy consumption in automotive vehicles. Additional desirable features and characteristics of the present invention will become apparent from the subsequent detailed description and the appended claims, taken in conjunction with the accompanying drawings and the foregoing technical field and background.

SUMMARY

In accordance with one embodiment, a vehicle includes a motor-generator unit coupled to a high-voltage bus. The motor-generator unit is configured to operate in a regenerative mode and a non-regenerative mode with respect to the high-voltage bus. The vehicle further includes an energy storage system coupled to the high-voltage bus, a load coupled to the high voltage bus; and a control module configured to operate the load at a first power consumption level during the regenerative mode, and to operate the high-voltage load at a second power consumption level, less than the first power consumption level, during the non-regenerative mode.

A method for managing energy consumption in a vehicle having a motor-generator unit includes: operating the motor generator unit in a non-regenerative mode; operating the load at a first power consumption level during the non-regenerative mode; determining that the motor-generator unit has changed to a regenerative mode; and operating the load at a second power consumption level greater than the first power consumption level during the regenerative mode.

DESCRIPTION OF THE DRAWINGS

The exemplary embodiments will hereinafter be described in conjunction with the following drawing figures, wherein like numerals denote like elements, and wherein:

FIG. 3 is a conceptual depiction of energy flow in the vehicle of FIG. 1 during a regenerative mode;

FIG. 4 is a graph depicting the power consumption of a high voltage load as a function of time in accordance with one example; and FIG. 5 is a flowchart depicting a method of managing energy in accordance with one embodiment.

DETAILED DESCRIPTION

The subject matter described herein generally relates to improved systems and methods for managing energy consumption in vehicles of the type that incorporate an energy storage system (e.g., hybrid and electric cars) by operating a high-voltage load in the vehicle at a higher power consumption level when the vehicle is in a regenerative mode, and operating the high-voltage load at a lower power consumption level when the vehicle is in a non-regenerative mode. By thus opportunistically operating high-voltage loads such as the vehicle's electric heater or electric compressor while power is being generated during a regenerative event (such as during braking), the energy consumed directly from the energy storage system is reduced, as are any associated resistive heating losses.

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. The following detailed description is merely exemplary in nature and is not intended to limit the disclosure or the application and uses thereof. Furthermore, there is no intention to be bound by any theory presented in the preceding background or the following detailed description.

Figure 1:
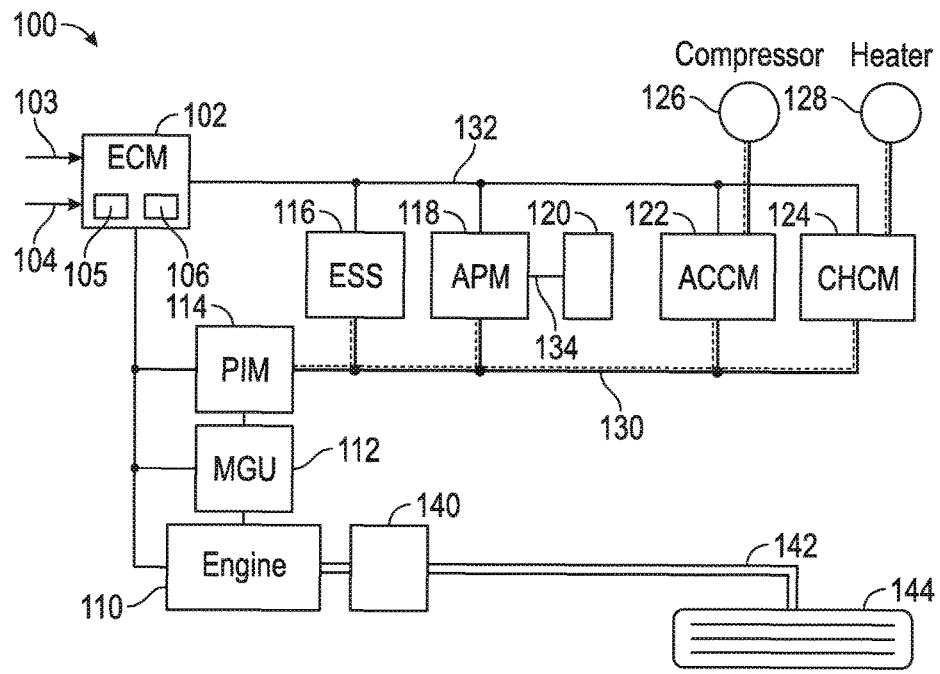
FIG. 1 is a conceptual overview of a vehicle including in accordance with an exemplary embodiment.

FIG. 1 is a conceptual overview of a vehicle 100 in accordance with an exemplary embodiment in which an engine 110 (e.g., an internal combustion engine) is coupled to at least one drive wheel 144 via a torque transfer mechanism 140 (e.g., a dual-clutch transmission) and a rotating output member 142. Engine 110 is coupled to a high-voltage motor-generator unit (MGU) (also referred to as a motor/generator), which itself is electrically coupled to (via, for example, a high-voltage AC connection) a power inverter module (PIM) 114.

PIM 114 is coupled to a high-voltage bus ("HV bus") 130 to provide power to a variety of modules within vehicle 100, including, in the illustrated embodiment, an energy storage system (ESS) 116 (e.g., a collection of nickel metal hydride (NiMH) battery cells), an auxiliary power module (APM) 118 (e.g., a DC-to-DC convertor), and one or more high voltage loads. In the illustrated embodiment, the high-voltage loads correspond to a compressor 126 and a heater 128; however, the invention is not so limited, as vehicle 100 may include any number of such high-voltage loads. An air-conditioning control module (ACCM) 122 is communicatively coupled to and adapted to control compressor 126, and likewise a coolant heater control module CHCM 124 is communicatively coupled to and adapted to control heater 128. APM 118 may be coupled (e.g., via a low-voltage bus 134) to one or more auxiliary components, such as a 12 VDC battery 120.

Vehicle 100 further includes a control module 102 configured to receive a variety of inputs (e.g., a brake pedal input 103, an accelerator pedal input 104, and the like) and to communicate via a data bus 132 or other suitable communication channel with the various modules as illustrated. Control module 102 may be a single module, or may be distributed over multiple modules within vehicle 100. In one embodiment, for example, control module 102 is part of an engine control module (ECM) as is known in the art. In the illustrated embodiment, control module 102 includes a processor 105 and a memory 106. Computer-readable software instructions may be stored in memory 106 and executed by processor 105 to carry out the various procedures and provide the functionality described herein.

Vehicle 100 and the illustrated components of FIG. 1 are collectively configured to operate in a variety of modes, including a "regenerative mode" and a "non-regenerative mode." As used herein, a "regenerative mode" refers to any mode in which ESS 116 is being recharged by MGU 112 (via PIM 114 and high-voltage bus 130) during operation of vehicle 100. Conversely, the term "non-regenerative mode" refers to any mode of operation in which ESS 116 is not being recharged via MGU 112. Stated another way, MGU 112 is configured to selectably operate in a regenerative mode and a non-regenerative mode with respect to HV bus 130: in the first case, providing power to HV bus 130, and in the latter case, acting as a load on HV bus 130. One common regenerative mode includes regenerative braking, in which application of a brake pedal (as determined via signal 103) causes engine 110 to charge ESS 116 via MGU 112 and PIM 114. Another regenerative mode corresponds to the same form of recharging of ESS 116, but during coasting of vehicle 100.

PIM 114 is configured to convert a high-voltage AC signal from MGU 112 to a high-voltage DC signal that is distributed to other components via high-voltage bus (or HV bus) 130. In that regard, the term "high voltage" is used herein consistent with the way the term is understood by a person of ordinary skill in the art working in the field of hybrid and electrical vehicle technology. In some embodiments, for example, HV bus 130 may provide 300 VDC or above—for example, about 360 VDC. In other embodiments, HV bus operates at a lower voltage. In contrast, bus 134 interconnecting APM 118 and 12V battery 120 is referred to herein as a "low-voltage bus."

Compressor 126 may be implemented as any suitable electrical compressor configured to operate via the power provided by HV bus 130 and in response to commands and/or a signal from ACCM 122, which in turn may receive commands (e.g., a request to operate at a particular power consumption level) from control module 102. The manner in which the power consumption level of compressor 126 is specified may vary depending upon the particular implementation of compressor 126. That is, the voltage, current, and/or duty-cycle of compressor 126 may be varied. In one embodiment, for example, compressor 126 is a "scroll" type compressor utilizing 134-A refrigerant and which receives 360 VDC from HV bus 130 to drive an internal 3-phase variable speed motor. The invention is not so limited, however.

Heater 128 may be implemented as any suitable electrical heating component capable of operating via the power provided by HV bus 130 and in response to commands from CHCM 124. In one embodiment, heater 128 is a variable high-voltage heating element operating at 360 VDC from HV bus 130.

In most cases, as will be appreciated, the operation of compressor 126 and/or heater 128 will generally be cyclical. That is, a passenger or driver of vehicle 100 will generally set a desired internal climate for vehicle 100, and compressors 126 and/or heater 128 (as controlled by modules 102, 122, and 124) will react accordingly, operating at an appropriate power consumption level (e.g., between zero and a maximum value) as needed. Such cyclical high-voltage components are particularly well suited to the opportunistic methods described herein, as their power consumption levels by their very nature will vary during normal operation.

Figure 2:
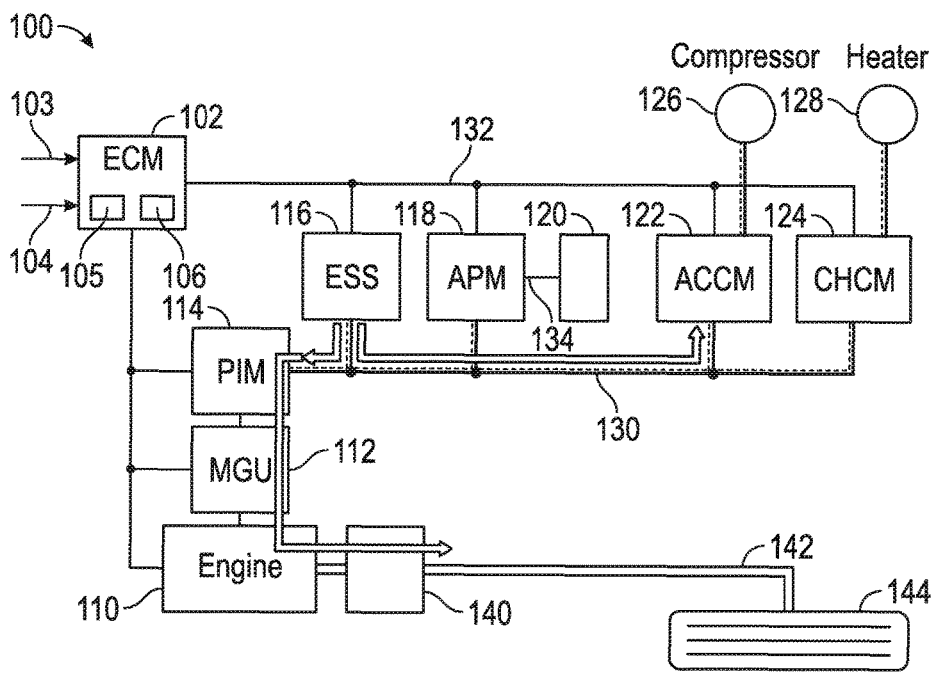
FIG. 2 is a conceptual depiction of energy flow in the vehicle of FIG. 1 during a non-regenerative model.

FIG. 2 is a conceptual depiction of energy flow in the vehicle of FIG. 1 during a non-regenerative mode, and FIG. 3 is a conceptual depiction of energy flow in vehicle 100 of FIG. 1 during a regenerative mode. More particularly, referring to FIG. 2, during a "normal" or non-regenerative mode, electrical power (indicated by the large arrows) may flow from ESS to wheel 144 via PIM 114, MGU 112, engine 110, torque transfer mechanism 140, and member 142 at the same time electrical power that is being provided to ACCM 122. This scenario might correspond, for example, to the case where vehicle 100 is accelerating while at the same time the air conditioner of vehicle 100 is being operated, and thus compressor 126 is consuming power. In contrast, FIG. 3 depicts a regenerative mode in which engine 110, MGU 112, and PIM 114 provide power to HV bus 130. In such a case, depending upon the power consumption level of compressor 126, additional power may or may not be required from ESS 116. As will be apparent, more power will be available on HV bus 130 during the regenerative mode of FIG. 3 because both ESS 116 and PIM 114 are providing power. In contrast, in FIG. 2, ESS 116 is solely available to provide power to ACCM 122, resulting in some level of discharging of ESS 116.

Accordingly, the present embodiments contemplate operating a high-voltage load (e.g., compressor 126 and/or heater 128) in vehicle 100 at a higher power consumption level when vehicle 100 is in a regenerative mode, and operating the high-voltage load at a lower power consumption level when vehicle 100 is in a non-regenerative mode.

FIG. 4 presents a graph 400 depicting power consumption (vertical axis 402) of a high voltage load (e.g., heater 128 of FIG. 1) as a function of time (horizontal axis 404) in accordance with one example. In this example, vehicle 100 is initially being operated in a non-generative mode (prior to time 410). Accordingly, control module 102 operates (via CHCM 124) heater 128 at an initial power consumption level 420. Between times 410 and 412, it is assumed that vehicle 100 is in a regenerative mode. Consequently, control module 102 operates heater 128 at a higher power consumption level 422. Subsequently, during a non-regenerative mode commencing at time 412, the power consumption level is reduced a level 424.

The extent to which power consumption level 422 is greater than consumption level 420 will vary depending upon the nature of the high-voltage load.

The process described above is also illustrated in the flowchart of FIG. 5, which shows an exemplary method 500 for managing energy consumption in a vehicle. Initially, at 502, a request to provide power to a high-voltage load is received by control module 102. That is, for example, the driver of vehicle 100 might modify the climate controls of vehicle 100 to request the maximum level of air-conditioning, requiring operation of compressor 126. Subsequently, at step 504, it is assumed that vehicle 100 is in a non-regenerative mode (e.g., accelerating). At 506, therefore, control module 102 sends a command (possibly via an intervening module) to the high-voltage load (e.g., compressor 126), directing that compressor 126 to operate at a first power consumption level. This state corresponds, for example, to the portion of graph 400 before time 410 in FIG. 4. At 508, the vehicle 100 changes to a regenerative mode. This might correspond, for example, to a regenerative braking mode. As a result, at 510, control module 102 sends a command to compressor 126 directing compressor 126 to operate at a second power consumption level that is greater than the first power consumption level. This mode corresponds to the region of FIG. 4 between times 410 and 412.

In summary, what has been described are improved systems and methods for managing energy consumption in hybrid and electric vehicles by operating a high-voltage load in the vehicle at a higher power consumption level when the vehicle is in a regenerative mode, and operating the high-voltage load at a lower power consumption level when the vehicle is in a non-regenerative mode. In this way, the energy consumed directly from the energy storage system (ESS 116) is reduced, as are any associated resistive heating losses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
   a high-voltage bus;
   a motor-generator unit coupled to the high-voltage bus and configured to operate in a regenerative mode and a non-regenerative mode with respect to the high-voltage bus;
   an energy storage system coupled to the high-voltage bus;
   a load coupled to the high voltage bus; and
   a control module configured to operate the load at a first power consumption level during the regenerative mode, and to operate the load at a second power consumption level, less than the first power consumption level, during the non-regenerative mode;
   wherein the second power consumption level is between 20% and 80% of the first power consumption level.

2. The vehicle of claim 1, wherein the load comprises an electrical compressor.

3. The vehicle of claim 1, wherein the load comprises an electrical heater.

4. The vehicle of claim 1, wherein the high-voltage bus operates at greater than 300 VDC.

5. The vehicle of claim 1, wherein the energy storage system comprises a plurality of NiMH battery cells.

6. The vehicle of claim 1, wherein the energy storage system is coupled to the motor-generator unit via a power invertor module.

7. The vehicle of claim 1, wherein the motor-generator unit is coupled to an internal combustion engine.

8. A method for managing energy consumption in a vehicle having a motor-generator unit, comprising:
   operating the motor generator unit in a non-regenerative mode;
   operating the load at a first power consumption level during the non-regenerative mode;
   determining that the motor-generator unit has changed to a regenerative mode; and
   operating the load at a second power consumption level greater than the first power consumption level during the regenerative mode;
   wherein the second power consumption level is between 20% and 80% of the first power consumption level.

9. The method of claim 8, wherein operating the load includes operating an electrical compressor.

10. The method of claim 8, wherein operating the load includes operating an electrical heater.

11. The method of claim 8, wherein operating the load includes operating the load at greater than 300 VDC.

12. The method of claim 8, further including recharging, during the regenerative mode, an energy storage system coupled to the load.

13. The method of claim 8, further including operating, during the non-regenerative mode, an internal combustion engine coupled to the motor-generator unit.

14. A control module for managing energy consumption in a vehicle, comprising:
   a memory for storing computer-readable software instructions therein;
   a processor configured to execute the computer-readable software instructions to:
   determine whether the vehicle is in a non-regenerative mode or a regenerative mode;
   send a first command to a high voltage load communicatively coupled to the processor requesting that the high voltage load operate at a first power consumption level during the regenerative mode; and
   send a second command to the high voltage load requesting that the high-voltage load operate at a second power consumption level, less than the first power consumption level, during the non-regenerative mode,
   wherein the second power consumption level is between 20% and 80% of the first power consumption level.

15. The control module of claim 14, wherein the processor, executing the software instructions, sends the first and second commands to an electrical compressor corresponding to the high-voltage load.

16. The control module of claim 14, wherein the processor, executing the software instructions, sends the first and second commands to an electrical heater corresponding to the high-voltage load.

17. The control module of claim 14, wherein the processor, executing the software instructions, is configured to recharge, during the regenerative mode, an energy storage system coupled to the high-voltage load.

* * * * *